US011243876B2

(12) United States Patent
Cimadamore et al.

(10) Patent No.: US 11,243,876 B2
(45) Date of Patent: Feb. 8, 2022

(54) TECHNIQUES FOR ACCESSING OFF-HEAP MEMORY

(71) Applicant: Oracle International Corporation, Redwood Shores, CA (US)

(72) Inventors: Maurizio Cimadamore, Donabate (IE); James Malcolm Laskey, Lunenburg (CA); Jorn Bender Vernee, Leiden (NL)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/038,766

(22) Filed: Sep. 30, 2020

(65) Prior Publication Data

US 2021/0133094 A1 May 6, 2021

Related U.S. Application Data

(60) Provisional application No. 62/931,505, filed on Nov. 6, 2019.

(51) Int. Cl.
*G06F 12/00* (2006.01)
*G06F 12/02* (2006.01)
(Continued)

(52) U.S. Cl.
CPC .......... *G06F 12/0223* (2013.01); *G06F 9/544* (2013.01); *G06F 12/06* (2013.01); *G06F 2212/251* (2013.01)

(58) Field of Classification Search
CPC ...... G06F 12/0223; G06F 9/544; G06F 12/06; G06F 2212/251
See application file for complete search history.

(56) References Cited

U.S. PATENT DOCUMENTS 9,594,752 B2    3/2017  Shaver et al.
2015/0339139 A1*  11/2015  Lin ...................... G06F 8/4434
                                                    717/148
(Continued)

FOREIGN PATENT DOCUMENTS

EP          2755129 A1      7/2014

OTHER PUBLICATIONS

Angelbert, "A Post-Apocalyptic sun.ntisc. Unsafe World," Discover practical strategies to build and operate microservices at InfoQ Live, on Aug. 25, available online at < https://www.infoq.com/articles/A-Post-Apocalyptic-sun.misc.Unsafe-World >, printed on Jul. 30, 2020, 15 pages.

(Continued)

*Primary Examiner* — Gurtej Bansal
(74) *Attorney, Agent, or Firm* — Invoke

(57) ABSTRACT

Techniques for accessing off-heap memory are disclosed. The system may receive a memory segment layout definition for a memory segment in a physical memory of a machine. The memory segment layout definition defines a number of elements and a number of sub-elements in each element of the plurality of elements. The system may allocate the particular memory segment in the physical memory and may store a reference to a position of a sub-element. The system may receive a request to access a first sub-element of a particular element of the plurality of elements. Based on the request, the system may identify the memory segment corresponding to the plurality of elements, identify the particular element of the plurality of elements, identify the first sub-element of the plurality of elements based the position of the first sub-element, and execute an Input or Output (IO) operation corresponding to the request.

20 Claims, 8 Drawing Sheets

(51) Int. Cl.
*G06F 9/54* (2006.01)
*G06F 12/06* (2006.01)

(56) References Cited

U.S. PATENT DOCUMENTS

2016/0011992 A1  1/2016  Sandoz et al.
2019/0347211 A1  11/2019  Bortnikov et al.

OTHER PUBLICATIONS

Byte Buffers and Non-Heap Memory, available online at < www.kdgregory.com/index.php?page=java.byteBuffer >, printed on Jul. 30, 2020, 15 pages.
Carellan, "Code Sample: Introduction to Java API for Persistent Memory Programming," available online at < https://software.intel.com/content/www/us/en/develop/articles/code-sample-introduction-to-java-api-for-persistent-memory-programming.html >, Published on May 4, 2018, 6 pages.
Going Off-Heap in Java 14 with Niall Maguire and Ryan Swain, available online at < https://blog.neueda.com/neueda-tech/going-off-heap-in-java-14-with-niall-maguire-and-ryan-swain/ >, Apr. 23, 2020, 12 pages.
JEP 370: Foreign-Memory Access API for JDK 14, available online at < https://www.jrebel.com/blog/jep-370-foreign-memory-access-api >, Feb. 18, 2020, 10 pages.
Jillegal, "Merge remote-tracking branch 'origin/master'," available online at < https://github.com/serkan-ozal/jillegal/commit/8996adf43c81c7f50e362cc01ee0b474adc8cc10#diff-04c6e90faac2675aa89e2176d2eeo7d8L58 >, printed on Jul. 31, 2020, 8 pages.
KDG Commons, Source Forge, Status: Beta, Brought to you by: kdgregory, available online at < https://sourceforge.net/p/kdgcommons/code/HEAD/tree/trunk//src/main/java/net/sf/kdgcommons/buffer/MappedFileBuffer.java >, printed on Jul. 31, 2020, 7 pages.
Managing Off-Heap Memory, available online at < https://gemfire.docs.pivotal.io/910/geode/managing/heap_use/off_heap_management.html >, printed on May 22, 2020, 6 pages.
Mechanical Sympathy, Hardware and software working together in harmony, available online at < https://mechanical-sympathy.blogspot.com/2012/10/compact-off-heap-structurestuples-in.html >, Oct. 17, 2012, 22 pages.
Memory Package, Data Sketches, available online at < https://datasketches.apache.org/docs/Memory/MemoryPackage.html >, printed on May 22, 2020, 9 pages.
Operating Principle and Implementation of Flink: Memory Management, Alibaba Cloud, available online at < https://medium.com/@Aibaba_Cloud/operating-principle-and-implementation-of-flink-memory-management-34dfcf885922 >, Jan. 14, 2018, 14 pages.
RTSJ Chapters 1.0.2, Introduction, available online at < https://www.rtsj.org/specjavadoc/book_index.html >, printed on Jul. 31, 2020, 1 page.

* cited by examiner

```
SequenceLayout seq = MemoryLayout.ofSequence (5,
    MemoryLayout.ofStruct(
        MemoryLayout.ofValueBits(32).withName("x"),
        MemoryLayout.ofValueBits(32).withName("y")
    )
);

var xHandle = seq.varHandle(int.class, PathElement.SequenceElement(), PathElement.GroupElement("x"));
var yHandle = seq.varHandle(int.class, PathElement.SequenceElement(), PathElement.GroupElement("y"));

try(MemorySegment points = MemorySegment.ofNative(seq)) {
    for (long i = 0; i < seq.elementCount(); i++) {
        xHandle.set(points, i, (int)i);
        yHandle.set(points, i, (int)i);
    }
}
```

Fig. 7

TECHNIQUES FOR ACCESSING OFF-HEAP MEMORY

INCORPORATION BY REFERENCE; DISCLAIMER

This application is hereby incorporated by reference: application No. 62/931,505 filed on Nov. 6, 2019. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to accessing memory. In particular, the present disclosure relates to providing and application programming interface for allowing access to elements and sub-elements of objects stored in off-heap memory.

BACKGROUND

The Java virtual machine has a heap that is a memory area shared among all Java virtual machine threads. The heap is the runtime data area from which memory for all class instances and arrays is allocated. The heap is created on virtual machine start-up. Heap storage for objects is reclaimed by an automatic storage management system (known as a garbage collector); objects are never explicitly deallocated. The heap may be of a fixed size or may be expanded as required by the computation and may be contracted if a larger heap becomes unnecessary. The memory for the heap does not need to be contiguous. A Java virtual machine implementation may provide a programmer or a user control over an initial size of the heap, as well as, if the heap can be dynamically expanded or contracted, control over the maximum and minimum heap size. A virtual machine has access to a memory area known as the heap. Java objects created by a program are assigned memory addresses within the heap. The Java virtual machine is adept at managing memory within the heap. A garbage collection process deallocates objects from the heap once those objects are no longer being referenced by programs.

Accessing foreign (i.e., off-heap) memory from a Java application can be useful for many reasons, including to avoid the cost and unpredictability associated with garbage collection, to share memory across multiple processes, and to allow memory contents to be serialized and deserialized. One way to facilitate foreign memory access is through the ByteBuffer Application Programming Interface (API).

Another common method for accessing foreign memory is through the use of the Unsafe APIs. The Unsafe APIs allow for off-heap memory allocations and reading and putting of data into off-heap memory. However, the Unsafe APIs, allow access to some unaccessible memory locations, which might cause an Operating System to kill the application.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7 is an example code snippet in accordance with one or more embodiments.

DETAILED DESCRIPTION

Figure 1:
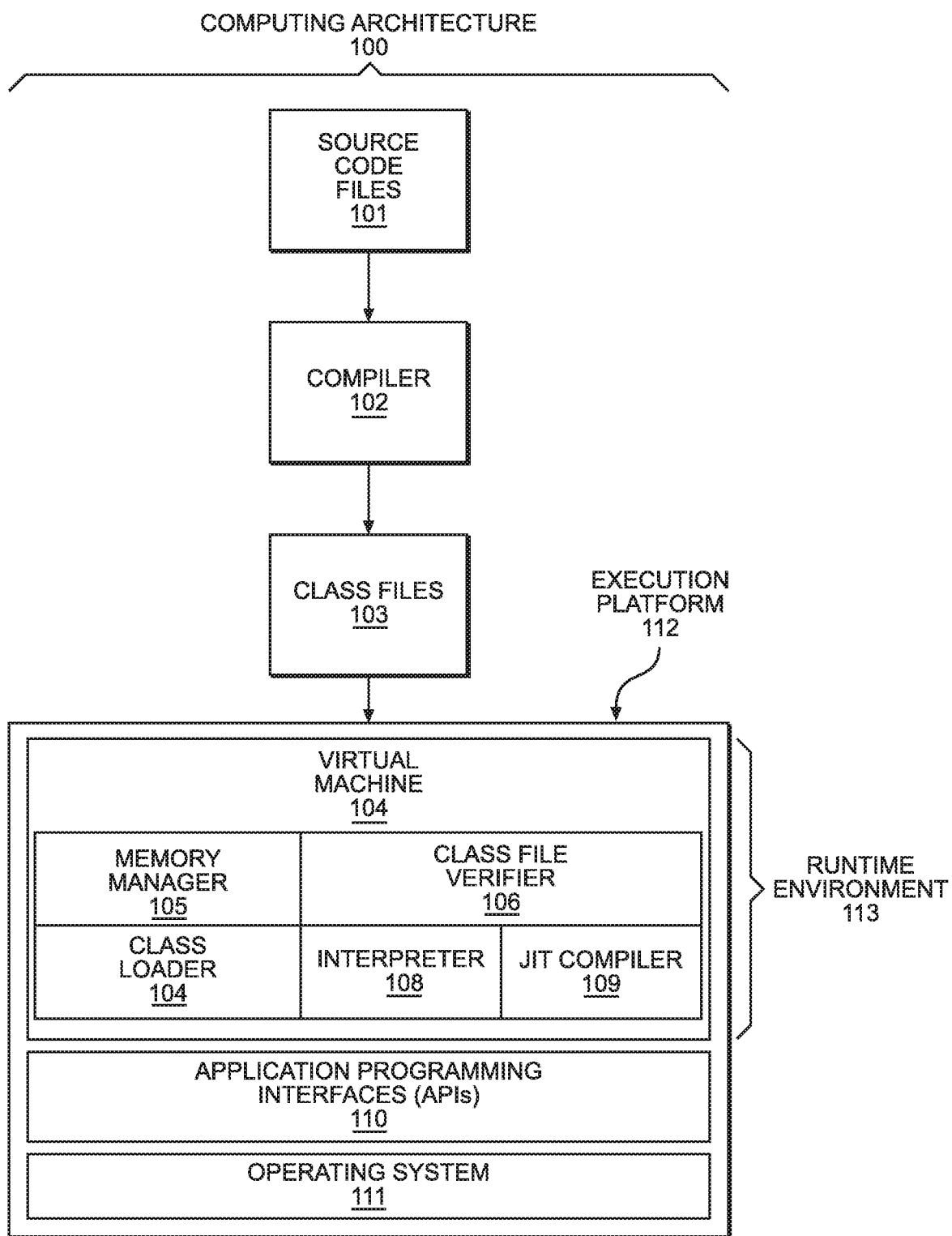
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. API FOR ACCESSING FOREIGN MEMORY
   3.1 STRUCTURE OF MEMORY SEGMENT VIEW
   3.2 FOREIGN MEMORY SEGMENT ACCESS TECHNIQUES
   3.3 EXAMPLE FOREIGN MEMORY ACCESS
4. MISCELLANEOUS; EXTENSIONS
5. HARDWARE OVERVIEW

1. General Overview

One or more embodiments configure and provide access to memory based on instructions received via an Application Programming Interface (API). The system may receive instructions, via the API, to operate on multiple foreign memory sources, including native memory, persistent memory, managed heap memory, etc. The system may execute deterministic memory deallocation based on explicit commands received via the API.

In an embodiment, the system receives instructions for configuring, allocating, and/or accessing memory in accordance with a user-defined memory layout. The user-defined memory layout may define, for example, a size, number, and/or type of data structures to be stored on a memory segment. The user-defined memory layout may further define a size, memory, and/or type of sub-elements within each data structure. Various data structures or sub-elements thereof may be accessed based on offsets corresponding to a data structure index or sub-element index. The system may generate and return handles for referencing particular data structures or sub-elements thereof that are stored on the memory segment.

The memory segment, configured in accordance with the user-defined memory layout, may be accessed using a memory segment view. A memory segment view creates a view over a contiguous memory segment. The memory segment view includes particular spatial and temporal bounds. The memory segment view may specify spatial bounds of a memory segment (e.g. as the upper and lower memory address views which act as the segment bounds). The memory segment view may also specify temporal bounds of the memory segment (e.g., that the memory segment is created, used and then closed (e.g., de-allocated) when no longer in use). A memory segment view may further include a reference to a particular physical memory address of a memory segment. A data structure index or a sub-element index as referred to above may be used in relation to the memory segment view corresponding to the memory segment.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
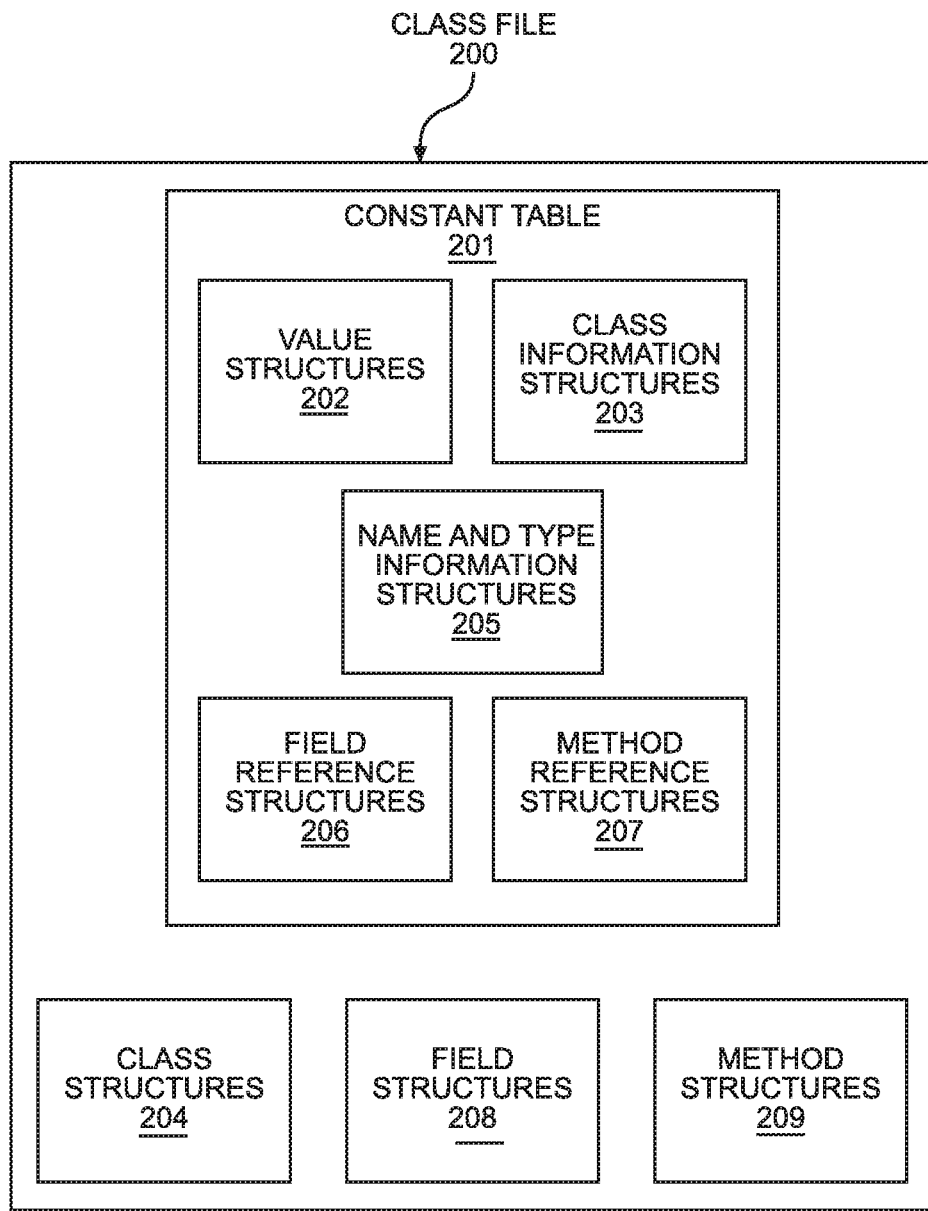
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:
class A
{
int add12and13( ) {
return B.addTwo(12, 13);
}
}
In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
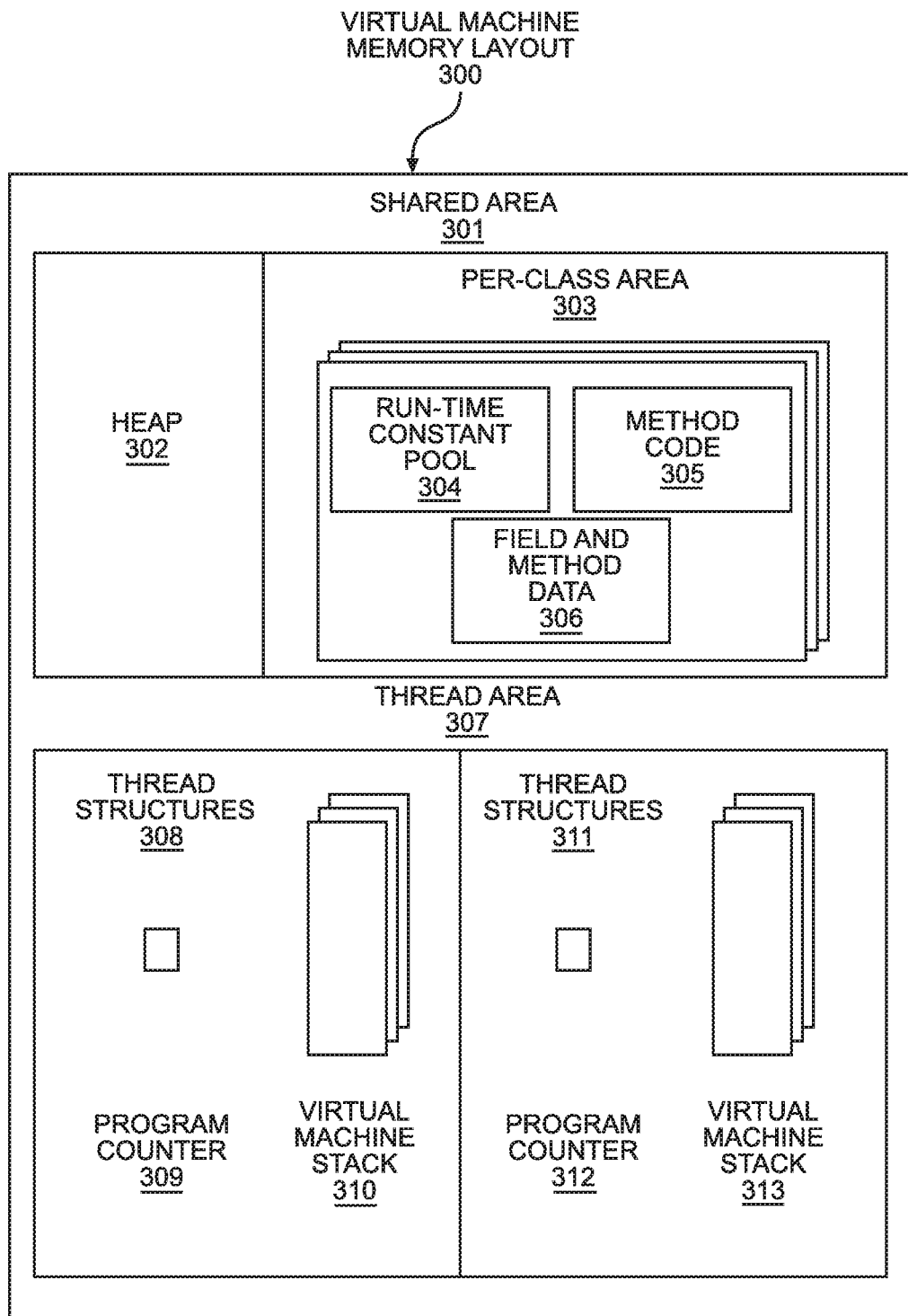
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
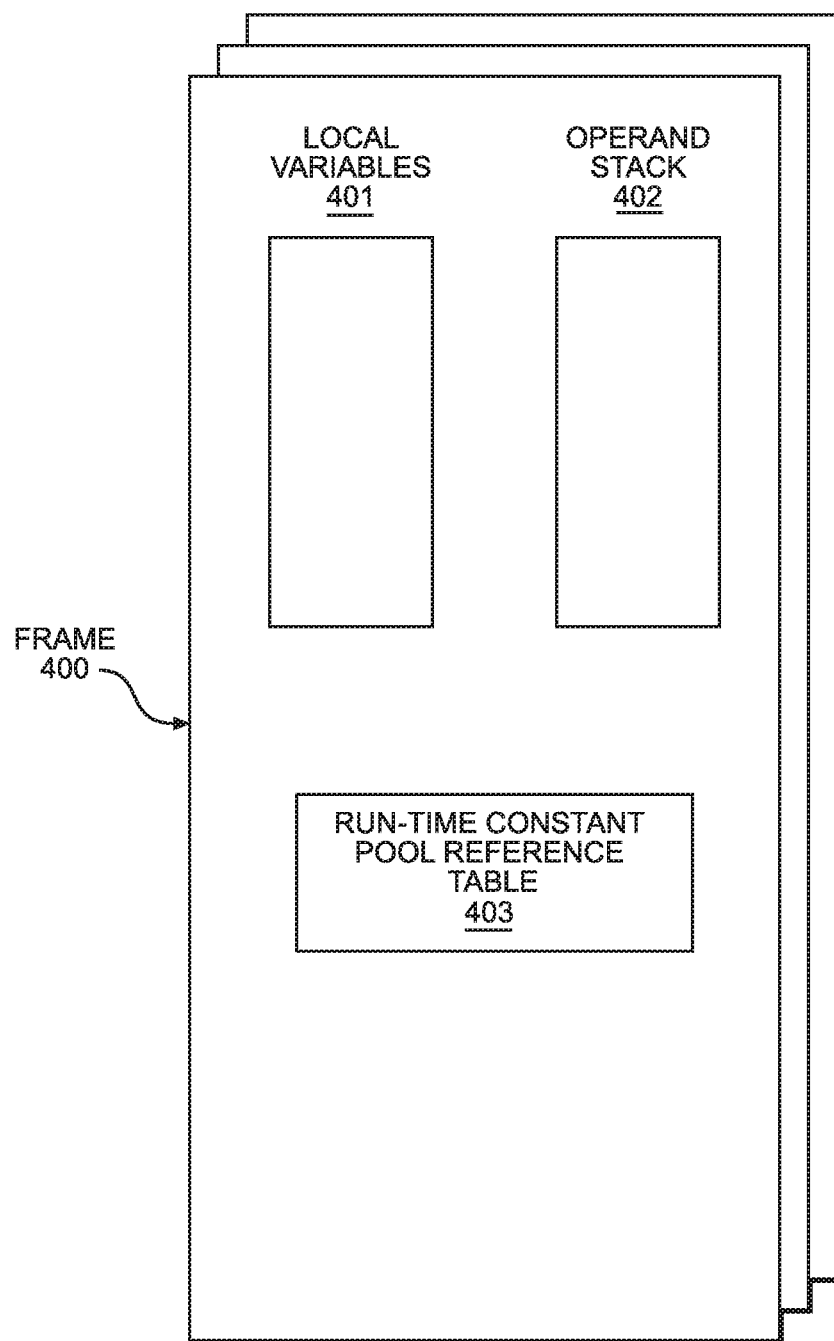
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. API for Accessing Foreign Memory

A memory segment includes a set of bytes, each byte corresponding to a respective memory address. The memory segment may be referenced and accessed via a memory segment view. A memory segment view creates a view over a contiguous memory segment. The memory segment view includes particular spatial and temporal bounds. The memory segment view may specify spatial bounds of a memory segment (e.g. as the upper and lower memory address views which act as the segment bounds). The memory segment view may also specify temporal bounds of the memory segment (e.g., that the memory segment is created, used and then closed (e.g., de-allocated) when no longer in use). In embodiments, the memory segment view includes confinement bounds (e.g., a thread owner indication which, if set, requires all operations on the memory segment view to occur within a particular thread). A memory segment view may further include a reference to a particular physical memory address of a memory segment.

Second, a memory address view includes a view of a real (e.g., physical) memory address within memory. As an example, when using the Java platform, the memory may be on-heap or off-heap. A memory address view may also specify a link to the memory segment view it refers to.

Third, a memory layout specifies a programmatic description of the contents of the memory segment. In particular, a memory layout can include a "'leaf" layout used for defining values, such as primitive data types or fields of bits. The leaf layouts can be aggregated into homogeneous sequences and heterogeneous groups

3.1 Structure of Memory Segment View

Figure 5:
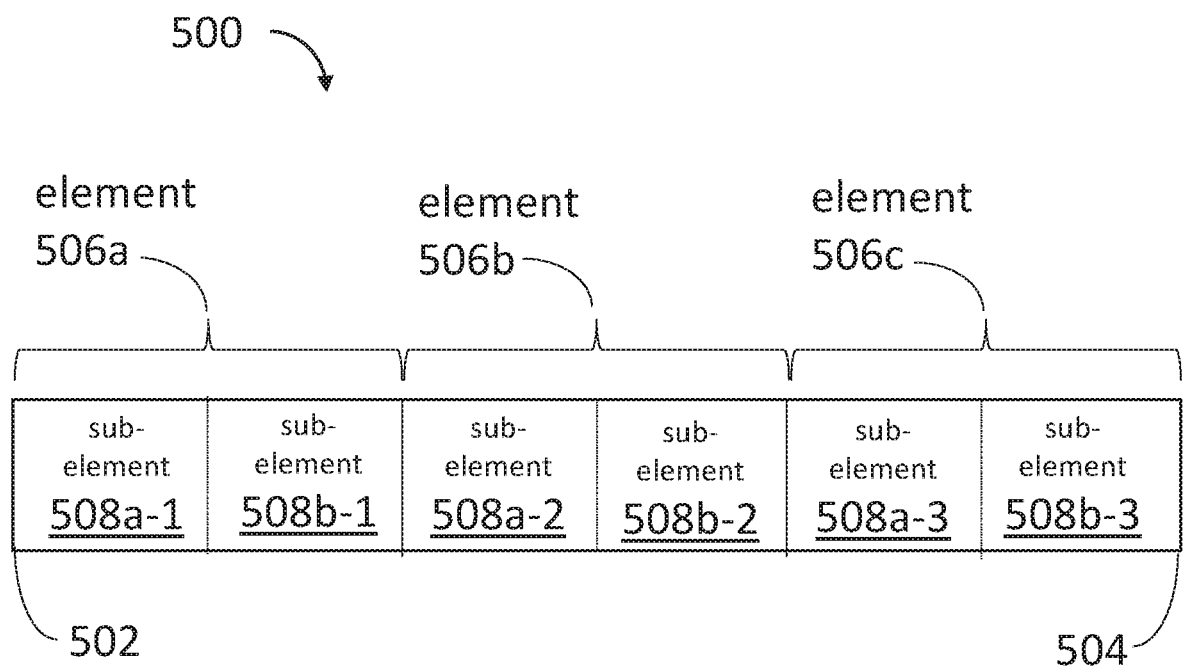
FIG. 5 illustrates a memory segment view in accordance with one or more embodiments.

FIG. 5 shows a memory segment view 500 of a corresponding memory segment. The memory segment view 500 has a base address 502. The base address 502 is an address of the first byte of the memory segment corresponding to the memory segment view 500. The memory segment view 500 further includes an upper bound 504. The upper bound 504 is an address of the last byte of the memory segment corresponding to the memory segment view 500. Alternatively, the upper bound 504 corresponds to a first address of a byte that is not contained in the memory segment 500. The memory segment view 500 is divided into a series of elements 506*a*, 506*b*, 506*c*, shown using solid lines. While three elements 506 are shown in the memory segment view 500 illustrated in FIG. 5, those of skill in the art will recognize that more or fewer elements may be included in each memory segment view.

Each element 506 may correspond to a data structure with various sub-elements. Each element 506 includes multiple sub-elements 508, shown using dashed lines. Each sub-element 508 may be a primitive, such as a byte, a short, an int, a long, a float, a double, a Boolean, and/or a char. In the example illustrated in FIG. 5, each element 506 includes two sub-elements 508*a* and 508*b*.

3.2 Foreign Memory Segment Access Techniques

Figure 6:
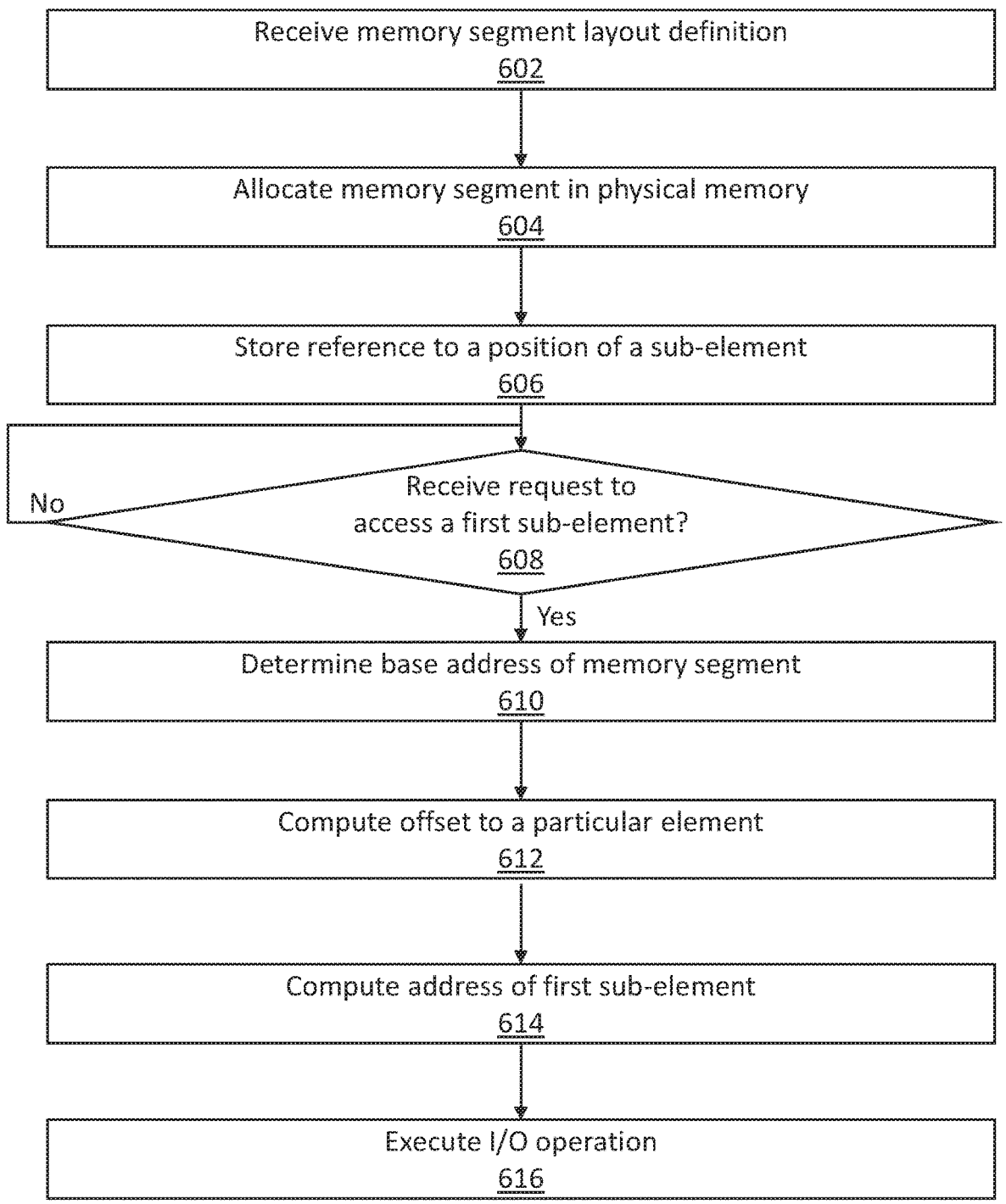
FIG. 6 illustrates a set of operations in accordance with one or more embodiments.

FIG. 6 illustrates a flowchart showing techniques for providing foreign memory segment access. One or more operations illustrated in FIG. 6 may be modified, rearranged, or omitted all together. Accordingly, the particular sequence of operations illustrated in FIG. 6 should not be construed as limiting the scope of one or more embodiments.

In an embodiment, the system receives, via an API, a memory layout (Operation 602). As discussed above, the memory layout is a memory segment layout definition that includes a programmatic description of the contents of a memory segment. In some embodiments, the memory layout may define a plurality of elements stored in the memory segment, a number of sub-elements contained in each element of the plurality of elements, a size of each element of the plurality of elements, a size of each sub-element, a data type of each sub-element, and/or an endianness of the memory segment. In some embodiments, the memory layout may further define a name associated with each sub-element. The memory layout may include many types of data.

The system may allocate a memory segment in the physical memory accessible via the API (Operation 604). In some embodiments, a base address of the memory segment can be selected based on a next available address, a size of the contiguous memory segment to be allocated, a type of memory to be allocated, etc.

A memory segment view, as described above, may be instantiated to reference and access the allocated memory segment. The memory segment view allows for direct access to various elements or sub-elements, as defined by the memory layout, via index values.

The system may store a reference to a position of one or more of the sub-elements in the plurality of elements (Operation 606). The reference may take the form of a VarHandle. In some embodiments, the reference may include a reference to a particular sub-element of a particular element of the memory segment. In other embodiments, the reference may include a reference to a particular sub-element, and may acquire a particular element of the memory segment at run-time.

In an embodiment, the system receives a request, via a memory segment view, to access a first sub-element of a particular element of the memory segment (Operation 608). The request may include a request to set a value of the first sub-element or a request to read the value stored in the first sub-element. The request may include a reference to the position of the sub-element among a plurality of sub-elements in the elements. The position may correspond to an index of the sub-element (e.g., the first sub-element, the second sub-element, or the third sub-element). In other embodiments, the reference to the position of the sub-element may include a name associated with the sub-element. The request may further include an index of the particular element among the plurality of elements.

In some embodiments, the reference may be a reference index comprising a plurality of references. Such a reference index may cover the entirety of the memory segment or any portion thereof. Each position in the reference index may correspond to multiple elements stored in memory, such that consecutive positions in the reference index (e.g., the first position and the second position) correspond to non-consecutive elements stored in the memory. The position within the reference index may correspond roughly to the position of an element within memory, such that a higher position in the reference index also indicates a greater memory address (e.g., the second position in the reference index indicates an element having a higher memory address than the element referenced by the first position in the reference index). Alternatively, there may be a reverse correspondence between the reference index position and the memory addresses of elements (e.g., the first position in the reference index indicates an element having a higher memory address than the element referenced by the second position in the reference index).

In response to receiving the request, the system determines a base address of the memory segment view associated with the first sub-element (Operation 610). In some embodiments, determining the base address of the memory segment view associated with the first sub-element may serve as a way to identify the corresponding memory segment.

In an embodiment, the system may compute a memory offset associated with a particular element (Operation 612). The memory offset may be computed as an offset from the base address of the memory segment view. The offset may be computed by determining the size of each of the plurality of elements and multiplying the size by the index of the particular element. In some embodiments, the size of each of the plurality of elements may be defined in the memory segment layout definition. In other embodiments, the size of each of the plurality of elements may be determined by summing the size of each sub-element of the elements, as defined in the memory segment layout definition. In some embodiments, computing the memory offset of the particular element serves to identify the particular element that includes the first sub-element.

The system may compute an address of the first sub-element (Operation 614). Calculating the address may include determining a sub-element offset associated with the first sub-element. The sub-element offset may be computed with respect to the particular element. The sub-element offset may be computed by summing sizes of any sub-elements that are stored prior to the first sub-element. In some embodiments, computing the sub-element offset may serve as a way to identify the first sub-element with the particular element. The first sub-element may be identified based on, for example, an index of the sub-element (e.g., sub-element 0, sub-element 2, etc.). In other embodiments, the first sub-element may be identified based on a name associated with the sub-element. The system may compute the address of the first sub-element by summing the base address, the offset, and the sub-element offset.

The system may execute an input or output (I/O) operation corresponding to the received request (Operation 616). For example, the system may execute one or more of a get or set operation using the computed address of the first sub-element.

3.3 Example Foreign Memory Access

FIG. 7 shows an example code segment that accesses foreign memory. The first line of code invokes the MemoryLayout abstraction to define a memory layout. In particular, the line creates a sequence memory layout where a particular element is repeated a set number of times. Referring to FIG. 7, the first argument of the MemoryLayout invocation specifies that the element is repeated 5 times. The second argument specifies that the repeated element is a struct. As shown in FIG. 7, the struct has two elements (sub-elements referenced by the memory segment view). The struct is the defined in an element by element way. The first element is specified to be a 32-bit element (e.g., an int) having a name "x". The second element is a 32-bit element (e.g., an int) having a name "y".

Next, the code creates a reference variable named "xHandle" that serves as a reference to particular sub-elements referenced by the memory segment view (particular elements of the structs that make up the segment). As shown in FIG. 7, the reference variable is a varHandle. The first argument of the varHandle invocation used to create "xHandle" specifies the class that the varHandle references. In the case of FIG. 7, the varHandle references the class int. The second argument specifies which particular element of the memory segment view is referred to by the varHandle. Because the argument is not specified, it is acquired at run-time of the code. The third argument specifies which sub-element of the particular element of the memory segment view is referenced by the varHandle. In the code shown in FIG. 7, the "xHandle" reference is a reference to the sub-element having the name "x".

Similarly, the code creates a reference variable named "yHandle" that serves as another reference to particular sub-elements of the memory segment (particular elements of the structs that make up the segment). As shown in FIG. 7, the reference variable is a varHandle. The first argument of the varHandle invocation used to create "yHandle" specifies the class that the varHandle references. In the case of FIG. 7, the varHandle references the class int. The second argument specifies which particular element of the memory segment view is referred to by the varHandle. Because the argument is not specified, it is acquired at run-time of the code. The third argument specifies which sub-element of the particular element of the memory segment view is referenced by the varHandle. In the code shown in FIG. 7, the "yHandle" reference is a reference to the sub-element having the name "y".

The system allocates a memory segment named "points". The memory segment is allocated in native memory (e.g., off-heap) and is associated with the memory segment layout definition specified above. The system also creates a memory segment view, which is a representation of the physical memory segment in the API used for referencing and accessing the memory segment. The system defines a variable "base" to store the base address of the memory segment The system creates a loop to set a value in each sub-element of the memory segment view. In particular, as shown in FIG. 7, the system invokes a set method to set a value for the memory address referenced by the variable "xHandle". The set method takes, as a first argument, a memory segment (e.g., the memory segment "points"). The system may determine a memory address (e.g., the base address) of the memory segment for use in setting the varHandle. As a second argument, the set method takes a specification of the particular element index within the memory segment. The sub-element of the particular element of the memory segment is already specified in the varHandle (the sub-element named "x"), so it is not specified by the set method. The third argument of the set method is the value to be stored in the memory address referenced in the var-Handle. The system similarly invokes a set method to set a value for the memory address referenced by the variable "yHandle".

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
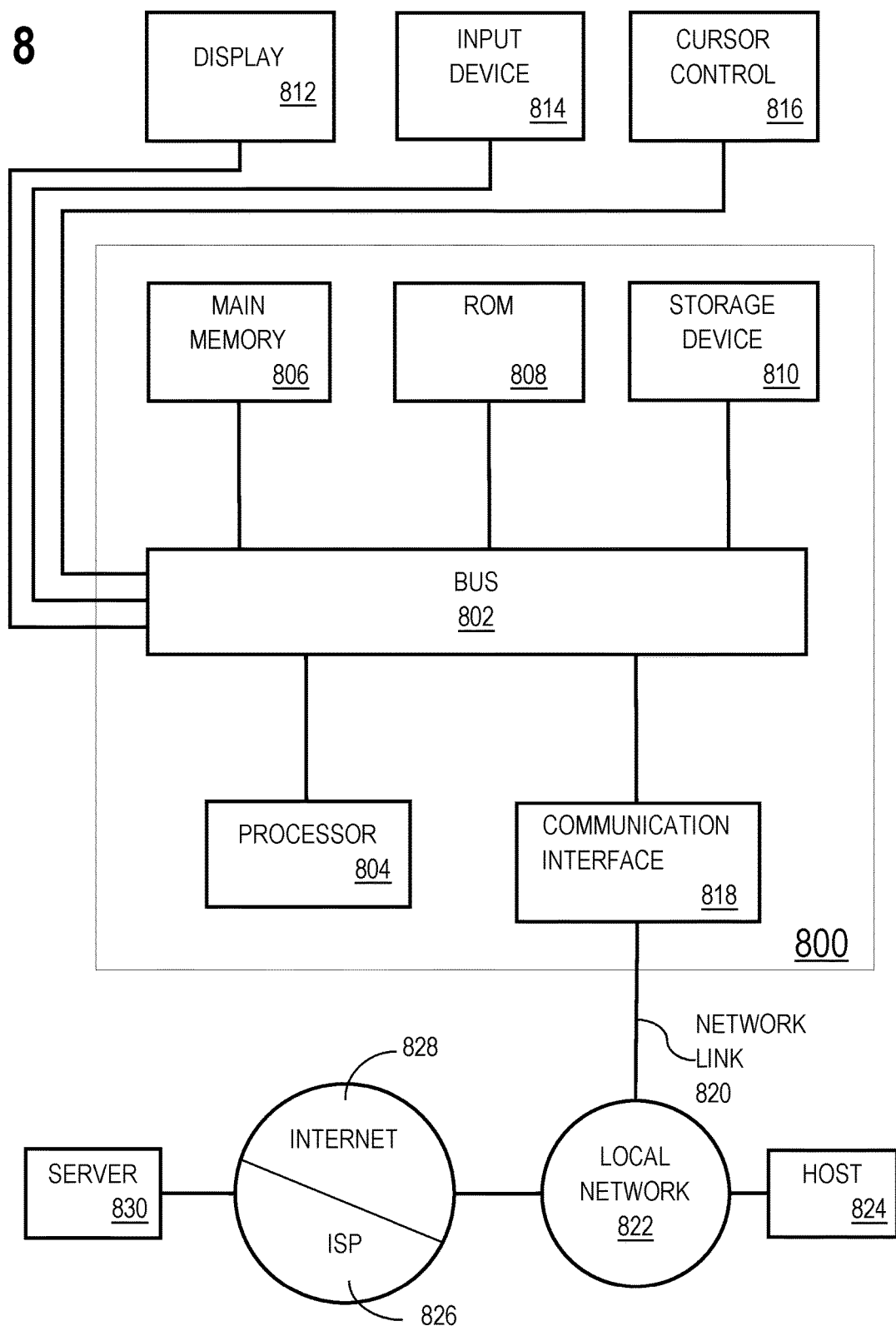
FIG. 8 illustrates a system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors cause:
   receiving, at an Application Programming Interface (API), a memory segment layout definition for a memory segment in a physical memory of a machine;
   wherein the memory segment layout definition defines (a) a number of a plurality of elements and (b) a number of sub-elements in each element of the plurality of elements;
   allocating the particular memory segment in the physical memory, the particular memory segment corresponding to a base address;
   storing a reference to a position of a sub-element of elements in the plurality of elements;
   receiving, via a memory segment view, a request to access a first sub-element of a particular element of the plurality of elements, the request identifying (a) the reference to the position of the sub-element of elements in the plurality of elements and (b) an index of the particular element of the plurality of elements;
   based on the request:
      identifying the memory segment corresponding to the plurality of elements;
      identifying the particular element of the plurality of elements;
      identifying the first sub-element of the plurality of elements based the position of the first sub-element in the sub-elements of the particular element;
      executing an Input or Output (IO) operation corresponding to the request.

2. The one or more media of claim 1, wherein the memory segment layout definition further defines an endianness for configuring the particular memory segment, and wherein identifying the particular element comprises determining an offset from a base memory address of the memory segment based on the endianness.

3. The one or more media of claim 1, wherein the memory segment layout definition further defines names associated with one or more of the sub-elements, and wherein the first sub-element is identified based on the name of the sub-element.

4. The one or more media of claim 1, wherein the memory segment layout definition further defines a size of each element in the plurality of elements;
   wherein identifying the particular element comprises:
      multiplying the index of the particular element with the size of each element to compute an offset; and applying the offset to a base memory address of the memory segment to compute a memory address of the particular element.

5. The one or more media of claim 4, wherein the memory segment layout definition further defines a size of each sub-element in each element of the plurality of elements;
wherein identifying the first sub-element comprises:
adding sizes of any sub-elements disposed prior to the first sub-element within the particular element to determine a sub-element offset; and
applying the sub-element offset to the memory address of the particular element to determine the address of the first sub-element.

6. The one or more media of claim 1, wherein the reference comprises a reference index, wherein each position in the reference index corresponds to an element stored in memory.

7. The one or more media of claim 6, wherein each position in the reference index corresponds to multiple elements stored in memory, such that first and second consecutive positions in the reference index correspond to non-consecutive elements stored in memory.

8. A method comprising:
receiving, at an Application Programming Interface (API), a memory segment layout definition for a memory segment in a physical memory of a machine;
wherein the memory segment layout definition defines (a) a number of a plurality of elements and (b) a number of sub-elements in each element of the plurality of elements;
allocating the particular memory segment in the physical memory, the particular memory segment corresponding to a base address;
storing a reference to a position of a sub-element of elements in the plurality of elements;
receiving, via a memory segment view, a request to access a first sub-element of a particular element of the plurality of elements, the request identifying (a) the reference to the position of the sub-element of elements in the plurality of elements and (b) an index of the particular element of the plurality of elements;
based on the request:
identifying the memory segment corresponding to the plurality of elements;
identifying the particular element of the plurality of elements;
identifying the first sub-element of the plurality of elements based the position of the first sub-element in the sub-elements of the particular element; and
executing an Input or Output (IO) operation corresponding to the request,
wherein the method is performed by at least one device including a hardware processor.

9. The method of claim 8, wherein the memory segment layout definition further defines an endianness for configuring the particular memory segment, and wherein identifying the particular element comprises determining an offset from a base memory address of the memory segment based on the endianness.

10. The method of claim 8, wherein the memory segment layout definition further defines names associated with one or more of the sub-elements, and wherein the first sub-element is identified based on the name of the sub-element.

11. The method of claim 8, wherein the memory segment layout definition further defines a size of each element in the plurality of elements;
wherein identifying the particular element comprises:
multiplying the index of the particular element with the size of each element to compute an offset; and
applying the offset to a base memory address of the memory segment to compute a memory address of the particular element.

12. The method of claim 11, wherein the memory segment layout definition further defines a size of each sub-element in each element of the plurality of elements;
wherein identifying the first sub-element comprises:
adding sizes of any sub-elements disposed prior to the first sub-element within the particular element to determine a sub-element offset; and
applying the sub-element offset to the memory address of the particular element to determine the address of the first sub-element.

13. The method of claim 8, wherein the reference comprises a reference index, wherein each position in the reference index corresponds to an element stored in memory.

14. The method of claim 13, wherein each position in the reference index corresponds to multiple elements stored in memory, such that first and second consecutive positions in the reference index correspond to non-consecutive elements stored in memory.

15. A system comprising:
at least one device including a hardware processor;
the system being configured to perform operations comprising:
receiving, at an Application Programming Interface (API), a memory segment layout definition for a memory segment in a physical memory of a machine, wherein the memory segment layout definition defines (a) a number of a plurality of elements and (b) a number of sub-elements in each element of the plurality of elements;
allocating the particular memory segment in the physical memory, the particular memory segment corresponding to a base address;
storing a reference to a position of a sub-element of elements in the plurality of elements;
receiving, via a memory segment view, a request to access a first sub-element of a particular element of the plurality of elements, the request identifying (a) the reference to the position of the sub-element of elements in the plurality of elements and (b) an index of the particular element of the plurality of elements;
based on the request:
identifying the memory segment corresponding to the plurality of elements;
identifying the particular element of the plurality of elements;
identifying the first sub-element of the plurality of elements based the position of the first sub-element in the sub-elements of the particular element; and
executing an Input or Output (IO) operation corresponding to the request,
wherein the method is performed by at least one device including a hardware processor.

16. The system of claim 15, wherein the memory segment layout definition further defines an endianness for configuring the particular memory segment, and wherein identifying the particular element comprises determining an offset from a base memory address of the memory segment based on the endianness.

17. The system of claim 15, wherein the memory segment layout definition further defines names associated with one or more of the sub-elements, and wherein the first sub-element is identified based on the name of the sub-element.

18. The system of claim 15, wherein the reference comprises a reference index, wherein each position in the reference index corresponds to an element stored in memory.

19. The system of claim 15, wherein the memory segment layout definition further defines a size of each element in the plurality of elements;
   wherein identifying the particular element comprises:
      multiplying the index of the particular element with the size of each element to compute an offset; and
      applying the offset to a base memory address of the memory segment to compute a memory address of the particular element.

20. The system of claim 19, wherein the memory segment layout definition further defines a size of each sub-element in each element of the plurality of elements;
   wherein identifying the first sub-element comprises:
      adding sizes of any sub-elements disposed prior to the first sub-element within the particular element to determine a sub-element offset; and
      applying the sub-element offset to the memory address of the particular element to determine the address of the first sub-element.

* * * * *